J. K. STEWART, DEC'D.
J. B. STEWART, EXECUTRIX.
AUTOMOBILE ENGINE STARTER.
APPLICATION FILED MAR. 13, 1916. RENEWED JULY 19, 1917.

1,242,999.

Patented Oct. 16, 1917.

Witnesses:

Inventor:
John K. Stewart.
by Burton & Burton.
his Attys.

UNITED STATES PATENT OFFICE.

JOHN K. STEWART, OF NEW YORK, N. Y.; JULIA B. STEWART, EXECUTRIX OF SAID JOHN K. STEWART, DECEASED.

AUTOMOBILE-ENGINE STARTER.

1,242,999.     Specification of Letters Patent.    Patented Oct. 16, 1917.

Original application filed November 10, 1915, Serial No. 60,728. Divided and this application filed March 13, 1916, Serial No. 83,807. Renewed July 19, 1917. Serial No. 181,647.

*To all whom it may concern:*

Be it known that I, JOHN K. STEWART, a citizen of the United States, residing at New York city, in the county of New York and State of New York, have invented a new and useful Improvement in Automobile-Engine Starters, of which the following is a specification, reference being had to the accompanying drawings, forming a part thereof.

This application is a division of my pending application, Serial No. 60,728, filed November 10, 1915.

The purpose of this invention is to provide an improved form of starter for the engine of an automobile, to be mounted upon the extreme cross-bar of the automobile chassis or frame, requiring no further support. It consists in the elements and features of construction shown and described, as indicated in the claims.

In the drawings:—

Figure 1:
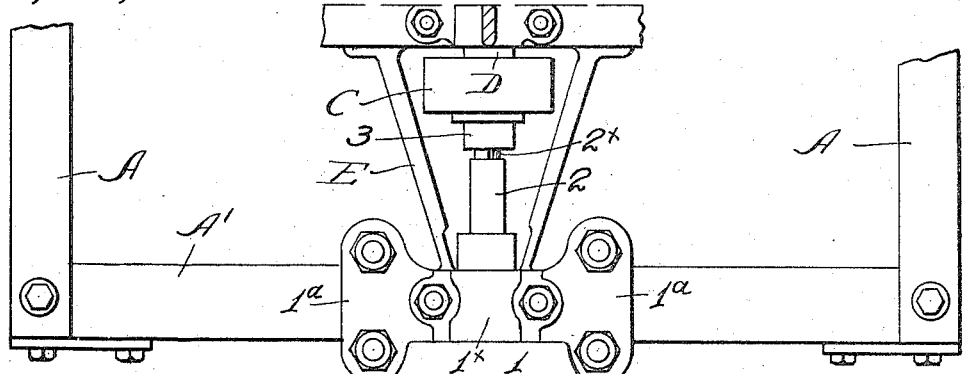
Figure 1 is a detail plan view of the forward end portion of the chassis or frame of an automobile having its engine equipped with a starting device embodying this invention.
Figure 3:
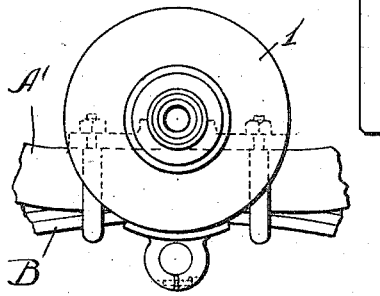
Fig. 3 is a forward end elevation.
Figure 4:
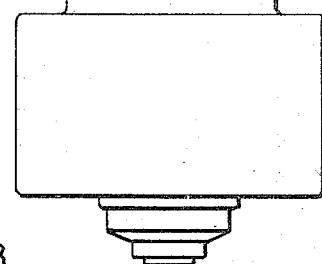
Fig. 4 is a rear end elevation of the starter detached from the chassis frame.
Figure 4:
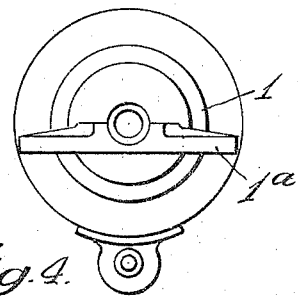
Figure 2:
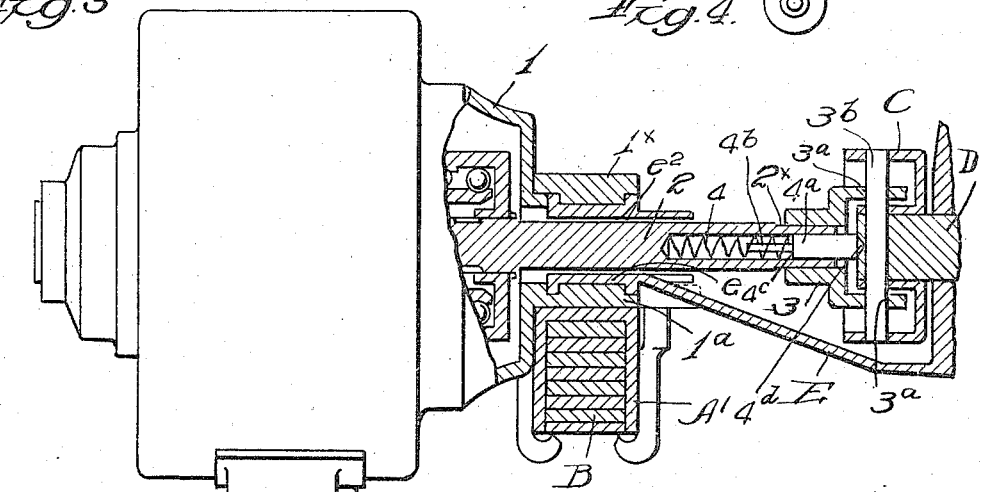
Fig. 2 is a partly sectional side elevation of the same, section being made for a part of the fore-and-aft extent at a vertical axial plane.

The starting mechanism which constitutes this invention is shown in the drawings applied to a familiar type of motor vehicle by substitution of the mounting parts of the starter in the position and place of certain familiar parts of such motor vehicle and its engine, which parts will be referred to but not shown in the drawings.

In the drawings, A represents a portion of the chassis or frame structure of the vehicle, $A^1$, being the forward transverse bar which is situated above the forward spring partly shown at B. C is the fan pulley on the engine crank shaft, D.

In place of the bearing pillow for the forward end of the engine frame or crank case, E, and the journal bearing of the customary starting shaft, which pillow together with the customary starting shaft and its crank is discarded for mounting on the vehicle and connecting with its engine the present starting device, there is mounted on the forward transverse frame bar, $A^1$, the starter casing, 1, having at the rear end a flange, $1^a$, fitted to the seat on the bar, $A^1$, from which the starting shaft bearing pillow has been removed together with its crank. The flange, $1^a$, has a capped seat, $1^x$, for the rear terminal, $e$, of the engine frame or crank case, in place of the similar seat with which the removed pillow was provided. In the casing, 1, there is journaled the starting shaft comprising a rear member, 2, which enters through,—but does not require any bearing support in,—the rear terminal, $e$, of the engine frame at the bearing aperture, $e^2$, vacated by the removed starting shaft. The rear squared end, $2^x$, of this engine-connected starting shaft member, 2, engages for sliding in and revolving with it, a cup-shaped terminal, 3, which is proportioned to enter the annular cavity of the fan pulley, C, in which the clutch-member of the customary starting shaft enters for engaging with the clutch pin, $3^b$, which customarily also secures the fan pulley to the engine crank-shaft; and said clutch-pin being first withdrawn to admit the cup-shaped terminal, 3, into the annular cavity of the fan pulley and then replaced passing through the pin holes, $3^a$, in the terminal, 3, secures the latter, and thereby the starting shaft member, 2, permanently to the fan pulley and thereby to the engine crank-shaft. The engine-connected starting shaft member, 2, has an axial bore in its rear end in which is lodged a coiled spring, 4, which reacts between the bottom of the bore and end of the engine crank shaft which is exposed at the center of the hub of the fan pulley for thrusting the shaft member, 2, forward at its sliding connection with the terminal, 3, for engaging and permitting disengagement of said shaft member and a winding member in the casing not herein shown, but fully shown and described in my said application, Serial No. 60,728. For transmitting the thrust of the spring 4, to the engine shaft a shouldered center-pin, $4^a$, which telescopes in the bore of the shaft and whose spindle, $4^b$, reduced in diameter to form the shoulder, $4^c$, extends within the coiled spring, has its cone point, $4^d$, seated in a center conical socket bored in the end of the shaft, and by this means the shaft member, 2, is steadied and kept axially alined with the engine shaft, preventing rattling which might otherwise occur at this connection which is necessarily somewhat loose to insure freedom of sliding of the shaft member, 2, in the terminal, 3.

It will be observed that the construction described constitutes a starter which is adapted to be supported securely and firmly upon the extreme forward or rear frame bar of the automobile which it is to serve, overhanging from such support but requiring no additional means of upholding it in position.

I claim:

1. In combination with the engine shaft and vehicle frame, a starter comprising a rigid casing having a flange projecting longitudinally from its rear end seating on and bolted rigidly to the forward cross bar of the vehicle frame and serving as the sole support of the casing on the vehicle; a sleeve seated on said flange for pivotally supporting the forward shaft bearing of the engine; a starting shaft journaled in the casing and extending through said sleeve with space therein about the shaft for the forward shaft bearing; and means for coupling the starting shaft to the engine shaft behind said shaft bearing.

2. In combination with the engine shaft and frame and vehicle frame, a starter comprising a casing having a flange by which it is mounted rigidly on and overhung forward from the forward cross bar of the vehicle frame; means on said frame for pivotally mounting the engine frame by means of the forward shaft bearing thereof; a starter shaft journaled solely in the casing and extending back through said engine shaft bearing, and means by which it engages the engine shaft rearward of said bearing.

3. In combination with the vehicle frame and engine mounted thereon having a shaft thereof terminating forwardly; a coupling member on the forward end of said shaft; a starter casing mounted rigidly on the front cross bar of the vehicle frame forward of said shaft terminal; a starting shaft journaled in said casing and extending rearward across the front frame bar; a coupling member slidably engaged with the rear end of said shaft for rotation together therewith, said coupling member being loosely engaged with the coupling member on the engine shaft for rotation therewith; the shaft having an axial bore in the rear end, and a spring-pressed center pin longitudinally reciprocable in said bore having the rear end cone-pointed, the engine shaft having its forward end centrally provided with a seat for the cone point for co-centering the starting shaft with the engine shaft.

In testimony whereof, I have hereunto set my hand at Los Angeles, this 26th day of February, 1916.

JOHN K. STEWART.

Copies of this patent may be obtained for five cents each, by addressing the "Commissioner of Patents, Washington, D. C."